United States Patent
Schwartz (10) Patent No.: US 8,766,949 B2
(45) Date of Patent: Jul. 1, 2014

(54) SYSTEMS AND METHODS FOR DETERMINING USER INPUT USING SIMULTANEOUS TRANSMISSION FROM MULTIPLE ELECTRODES

(75) Inventor: Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 358 days.

(21) Appl. No.: 13/335,512

(22) Filed: Dec. 22, 2011

(65) Prior Publication Data

US 2013/0162585 A1    Jun. 27, 2013

(51) Int. Cl.
*G06F 3/045*    (2006.01)

(52) U.S. Cl.
USPC ........................................ 345/174; 178/18.06

(58) Field of Classification Search
None
See application file for complete search history.

(56) References Cited

U.S. PATENT DOCUMENTS

| | | | |
|---|---|---|---|
| 4,170,025 A | 10/1979 | Benkley et al. | |
| 4,459,541 A | 7/1984 | Fielden et al. | |
| 4,733,222 A | 3/1988 | Evans | |
| 4,974,236 A | 11/1990 | Gurcan et al. | |
| 5,304,937 A | 4/1994 | Meyer | |
| 5,305,017 A | 4/1994 | Gerpheide | |
| 5,648,642 A | 7/1997 | Miller | |
| 5,666,113 A | 9/1997 | Logan | |
| 5,787,126 A | 7/1998 | Itoh et al. | |
| 5,790,106 A | 8/1998 | Hirano et al. | |
| 5,825,352 A | 10/1998 | Bisset et al. | |
| 5,841,078 A | 11/1998 | Miller | |
| 5,861,875 A | 1/1999 | Gerpheide | |
| 5,880,411 A | 3/1999 | Gillespie et al. | |
| 5,917,906 A | 6/1999 | Thornton | |
| 5,940,526 A | 8/1999 | Setlak et al. | |
| 5,963,679 A | 10/1999 | Setlak | |
| 6,067,368 A | 5/2000 | Setlak et al. | |
| 6,259,804 B1 | 7/2001 | Setlak et al. | |
| 6,392,167 B1 | 5/2002 | Nakagawa | |

(Continued)

FOREIGN PATENT DOCUMENTS

| | | |
|---|---|---|
| EP | 0749086 A1 | 12/1996 |
| EP | 1624399 A1 | 2/2006 |

(Continued)

OTHER PUBLICATIONS

USPTO, Notice of Allowance and Fee(s) Due for U.S. Appl. No. 13/679,355, mailed Jun. 11, 2013.

(Continued)

*Primary Examiner* — Jason Olson
(74) *Attorney, Agent, or Firm* — Ingrasia Fisher & Lorenz P.C.

(57) ABSTRACT

The embodiments described herein provide improved sensor devices. In one embodiment, an input device comprises a processing system, transmitter sensor electrodes, and a receiver sensor electrode. The processing system is configured to simultaneously transmit a first transmitter signal with a first transmitter electrode and a second transmitter signal with a second transmitter electrode. In one embodiment the first transmitter signal corresponds to an upper sideband and the second transmitter signal corresponds to a lower sideband. In another embodiment the first transmitter signal is in quadrature with the second transmitter signal. The processing system is further configured to receive a resulting signal with a receiver electrode, the resulting signal comprising effects corresponding to both the first transmitter signal and the second transmitter signal. The determination module is configured to demodulate the resulting signal to produce a first output signal and a second output signal and to determine positional information.

23 Claims, 6 Drawing Sheets

(56) References Cited

U.S. PATENT DOCUMENTS

| | | |
|---|---|---|
| 6,570,557 B1 | 5/2003 | Westerman et al. |
| 6,621,487 B2 | 9/2003 | Iwasaki et al. |
| 6,704,005 B2 | 3/2004 | Kato et al. |
| 6,771,280 B2 | 8/2004 | Fujisaki et al. |
| 6,788,288 B2 | 9/2004 | Ano |
| 7,075,316 B2 | 7/2006 | Umeda et al. |
| 7,106,720 B2 | 9/2006 | Ozluturk et al. |
| 7,292,229 B2 | 11/2007 | Morag et al. |
| 7,372,455 B2 | 5/2008 | Perski et al. |
| 7,451,050 B2 | 11/2008 | Hargreaves |
| 7,616,786 B2 | 11/2009 | Setlak |
| 7,812,827 B2 | 10/2010 | Hotelling et al. |
| 7,868,874 B2 | 1/2011 | Reynolds |
| 8,338,724 B2 | 12/2012 | Reynolds |
| 2002/0049070 A1 | 4/2002 | Bick |
| 2002/0050983 A1 | 5/2002 | Liu et al. |
| 2002/0173337 A1 | 11/2002 | Hajimiri et al. |
| 2002/0185981 A1 | 12/2002 | Dietz et al. |
| 2003/0030628 A1 | 2/2003 | Sato et al. |
| 2003/0035570 A1 | 2/2003 | Benkley, III |
| 2003/0067449 A1 | 4/2003 | Yoshikawa et al. |
| 2003/0076306 A1 | 4/2003 | Zadesky et al. |
| 2003/0133432 A1 | 7/2003 | Moerder |
| 2004/0056785 A1 | 3/2004 | Webster et al. |
| 2004/0056849 A1 | 3/2004 | Lohbihler et al. |
| 2004/0081339 A1 | 4/2004 | Benkley, III |
| 2005/0005703 A1 | 1/2005 | Saito et al. |
| 2005/0024065 A1 | 2/2005 | Umeda et al. |
| 2005/0052425 A1 | 3/2005 | Zadesky et al. |
| 2005/0073324 A1 | 4/2005 | Umeda et al. |
| 2005/0122785 A1 | 6/2005 | Umeda et al. |
| 2005/0150697 A1 | 7/2005 | Altman et al. |
| 2006/0293017 A1 | 12/2006 | Kim et al. |
| 2007/0047669 A1 | 3/2007 | Mak et al. |
| 2007/0062852 A1 | 3/2007 | Zachut et al. |
| 2007/0109274 A1 | 5/2007 | Reynolds |
| 2008/0158167 A1 | 7/2008 | Hotelling et al. |
| 2008/0192018 A1 | 8/2008 | Park et al. |
| 2009/0135973 A1 | 5/2009 | He |
| 2009/0143031 A1 | 6/2009 | Shah |
| 2009/0189867 A1 | 7/2009 | Krah et al. |
| 2009/0273579 A1 | 11/2009 | Zachut et al. |
| 2009/0322351 A1 | 12/2009 | McLeod |
| 2009/0322578 A1 | 12/2009 | Petrovic |
| 2010/0059295 A1 | 3/2010 | Hotelling |
| 2010/0060589 A1 | 3/2010 | Wilson |
| 2010/0060591 A1 | 3/2010 | Yousefpor et al. |
| 2010/0110037 A1 | 5/2010 | Huang et al. |
| 2010/0159858 A1 | 6/2010 | Dent et al. |
| 2010/0189197 A1 | 7/2010 | Nakatani |
| 2010/0321331 A1 | 12/2010 | Oda et al. |
| 2011/0037724 A1 | 2/2011 | Paulsen et al. |
| 2011/0063993 A1 | 3/2011 | Wilson et al. |
| 2011/0084857 A1 | 4/2011 | Marino et al. |
| 2012/0056841 A1 | 3/2012 | Krenik et al. |

FOREIGN PATENT DOCUMENTS

| | | |
|---|---|---|
| KR | 20100042761 A | 4/2010 |
| WO | 0247018 A2 | 6/2002 |
| WO | 2004107146 A2 | 12/2004 |

OTHER PUBLICATIONS

United States Patent and Trademark Office, Office Action for U.S. Appl. No. 12/962,096, dated Jun. 19, 2012.

United States Patent and Trademark Office, Notice of Allowance for U.S. Appl. No. 12/962,110, dated Jul. 16, 2012.

Smith, et al.; "Code-Division Multiplexing of a Sensor Channel: A Software Implementation"; IEEE Journal; Apr. 1999; pp. 725-731; vol. 17, No. 4.

Cichocki, et al.; "A Switched-Capacitor Interface for Capacitive Sensors Based on Relaxation Oscillators"; IEEE Journal; Oct. 1990; pp. 797-799; vol. 39, No. 5.

Huang, et al; "Electronic Transducers for Industrial Measurement of Low Value Capacitances"; J. Phys. E: Sci. Instrum. 21 1988; pp. 242-250; IOP Publishing Printed in the U.K.

Philipp, Hal; "Charge Transfer Sensing", pp. 1-9; Copyright 1997.

Zimmerman, et al.; "Applying Electric Field Sensing to Human-Computer Interfaces", MIT Media Laboratory; pp. 1-8; to be published in (IEEE SIG) CHI May 1995.

Yamada, et al.; "A Switched-Capacitor Interface for Capacitive Pressure Sensors", IEEE Journal; Feb. 1992; pp. 81-86; vol. 41, No. 1.

Smith, et al.; "Electric Field Sensing for Graphical Interfaces"; IEEE Computer Graphics and Applications; May/Jun. 1998; pp. 54-60.

Vigoda, Benjamin; "A Nonlinear Dynamic System for Spread Spectrum Code Acquisition"; MIT Media Laboratory; pp. 10-90, Aug. 9, 1999.

International Search Report for International Application No. PCT/US2006/040266, mailed Mar. 30, 2007.

Chinese Office Action 200680042701.5 dated May 25, 2011.

International Search Report for International Application No. PCT/US2011/051998, mailed Feb. 23, 2012.

Japan Patent Office "Notice of Reasons for Rejection" mailed Feb. 29, 2012 for Japanese Patent Application No. P2008-541174.

Yam, Y.-O et al. "Innovative Demodulation Method for SSB Technique" IEE Proc.-Circuits Devices Syst., vol. 146, No. 3, Jun. 1999.

West, J.D.K. "The Application of the Asymmetric Polyphase Filter in an SSB Transceiver" Grinel Natal Branch of Grinaker Electronics, IEEE 1991.

Chinese Office Action 200680042701.5 dated Sep. 14, 2011.

The International Bureau of WIPO, PCT International Preliminary Report on Patentability in PCT International Application No. PCT/US2011/051998, mailed Mar. 28, 2013.

International Searching Authority, PCT Written Opinion of the International Searching Authority in PCT International Application No. PCT/US2011/051998, mailed Feb. 23, 2012.

United States Patent and Trademark Office, U.S. Office Action mailed Aug. 15, 2013 for U.S. Appl. No. 13/233,790.

United States Patent and Trademark Office, U.S. Notice of Allowance dated Aug. 20, 2012 for U.S. Appl. No. 12/962,096.

USPTO, Final Office Action in U.S. Appl. No. 13/161,267, mailed Sep. 10, 2013.

USPTO, Ex parte Quayle Office Action for U.S. Appl. No. 13/679,355, mailed Apr. 5, 2013.

USPTO, Office Action for U.S. Appl. No. 13/161,267, mailed Apr. 4, 2013.

USPTO, Office Action in U.S. Appl. No. 13/233,781, mailed Jul. 18, 2013.

SYSTEMS AND METHODS FOR DETERMINING USER INPUT USING SIMULTANEOUS TRANSMISSION FROM MULTIPLE ELECTRODES

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Proximity sensor devices may typically incorporate either profile capacitive sensors or capacitive image sensors. Capacitive profile sensors alternate between multiple axes (e.g., x and y), while capacitive image sensors scan multiple transmitter rows to produce a more detailed capacitive "image" of "pixels" associated with an input object. While capacitive image sensors are advantageous in a number of respects, there is a continuing need to improve the performance of such devices. For example, to improve the responsiveness of such sensors, or to improve the sensor's resistance to various types of interference.

Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved sensor devices. Specifically, the devices and methods provide the ability to accurately determine user input with an input device using the simultaneous transmission of transmitter signals from multiple transmitter electrodes to a receiver electrode. In some embodiments, the simultaneous transmission facilitates improved input device performance by reducing the time needed to generate a full capacitive image used to detect user input.

In one embodiment, an input device comprises a processing system, transmitter sensor electrodes, and a receiver sensor electrode, where the transmitter sensor electrodes and the receiver sensor electrode are capacitively coupled. A processing system in accordance with one embodiment comprises a sensor module and a determination module. The sensor module is configured to simultaneously transmit a first transmitter signal with a first transmitter electrode and a second transmitter signal with a second transmitter electrode, where the first transmitter signal corresponds to an upper sideband and the second transmitter signal corresponds to a lower sideband. The sensor module is further configured to receive a resulting signal with a receiver electrode, where the resulting signal comprises effects corresponding to both the first transmitter signal and the second transmitter signal. The determination module is configured to demodulate the resulting signal to produce a first output signal and a second output signal, and to determine positional information for an input object based on at least one of the first output signal and the second output signal.

A processing system in accordance with another embodiment comprises a sensor module and a determination module. The sensor module is configured to simultaneously transmit a first transmitter signal with a first transmitter electrode and transmit a second transmitter signal with a second transmitter electrode, where the first transmitter signal is in quadrature with the second transmitter signal. The sensor module is further configured to receive a resulting signal with a receiver electrode, where the resulting signal comprises effects corresponding to both the first transmitter signal and the second transmitter signal. The determination module is configured to demodulate the resulting signal to produce a first output signal and a second output signal, and to determine positional information for an input object based on at least one of the first output signal and the second output signal.

An input device in accordance with another embodiment comprises a first transmitter electrode, a second transmitter electrode, a receiver electrode and a processing system operatively coupled to the first transmitter electrode, the second transmitter electrode, and the receiver electrode. The processing system is configured to simultaneously transmit a first transmitter signal with the first transmitter electrode, a second transmitter signal with the second transmitter electrode, where the first transmitter signal corresponds to an upper sideband, and wherein the second transmitter signal corresponds to a lower sideband. The processing system is further configured to receive a resulting signal with the receiver electrode, wherein the resulting signal comprises effects corresponding to each of the first transmitter signal and the second transmitter signal. The processing system is further configured to demodulate the resulting signal to produce a first output signal and a second output signal, determine a first measurement of capacitive coupling between the first transmitter electrode and the receiver electrode based at least in part on first output signal, determine a second measurement of capacitive coupling between the second transmitter electrode and the receiver electrode based at least in part on the second output signal, and determine positional information for an input object based on at least in part the first measurement and the second measurement.

An input device in accordance with another embodiment comprises a first transmitter electrode, a second transmitter electrode, a third transmitter electrode, a fourth transmitter electrode, a receiver electrode, and a processing system operatively coupled to the first transmitter electrode, the second transmitter electrode, the third transmitter electrode, the fourth transmitter electrode, and the receiver electrode. The processing system is configured to simultaneously transmit a first transmitter signal with the first transmitter electrode, a second transmitter signal with the second transmitter electrode, a third transmitter signal with the third transmitter electrode, and a fourth transmitter signal with the fourth transmitter electrode, wherein the first transmitter signal and the third transmitter signal correspond to an upper sideband, and the second transmitter signal and the fourth transmitter signal corresponds to a lower sideband, and wherein the first transmitter signal is in quadrature with the third transmitter signal and the second transmitter signal is in quadrature with the fourth transmitter signal. The processing system is further configured to receive a resulting signal with the receiver electrode, wherein the resulting signal comprises effects corresponding to each of the first transmitter signal, the second transmitter signal, the third transmitter signal and the fourth transmitter signal. The processing system is further configured to demodulate the resulting signal to produce a first output signal, a second output signal, a third output signal, and a fourth output signal. The processing system is further configured to determine a first measurement of capacitive coupling between the first transmitter electrode and the receiver electrode based at least in part on first output signal, determine a second measurement of capacitive coupling between the second transmitter electrode and the receiver electrode based at least in part on the second output signal, determine a third measurement of capacitive coupling between the third transmitter electrode and the receiver electrode based at least in part on third output signal, and determine a fourth measurement of capacitive coupling between the fourth transmitter electrode and the receiver electrode based at least in part on the fourth output signal. Finally, the processing system is configured to determine positional information for an input object based on at least in part the first measurement, the second measurement, the third measurement and the fourth measurement.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
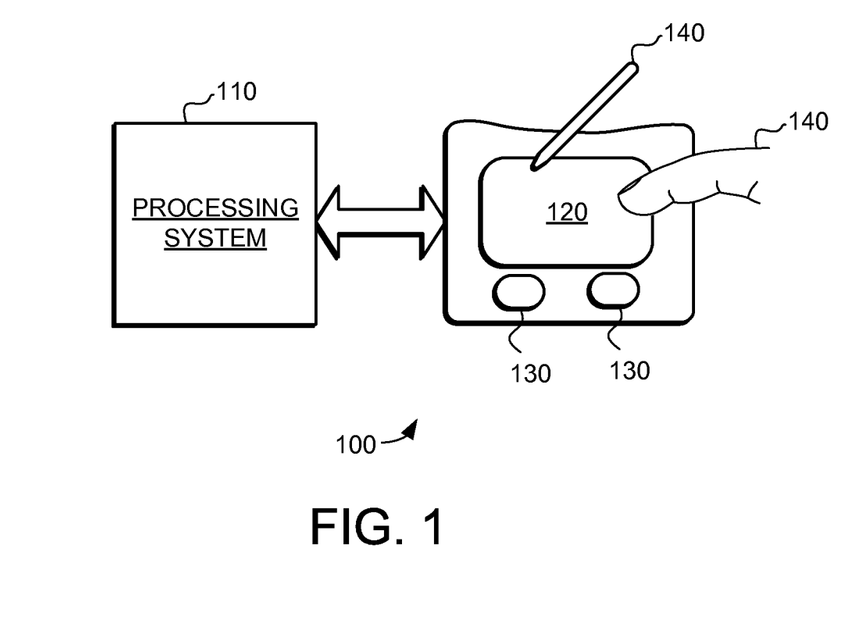
FIG. 1 is a block diagram of an exemplary system that includes an input device in accordance with an embodiment of the invention.

Various embodiments of the present invention provide input devices and methods that facilitate improved usability. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s). In accordance with the embodiments described herein, the sensor module may be configured to simultaneously transmit a first transmitter signal with a first transmitter electrode and a second transmitter signal with a second transmitter electrode. The sensor module may be further configured to receive a resulting signal with a receiver electrode, where the resulting signal comprises effects corresponding to both the first transmitter signal and the second transmitter signal. A further example includes determination modules, where the determination module is configured to demodulate the resulting signal to produce a first output signal and a second output signal, and to determine positional information for an input object based on at least one of the first output signal and the second output signal.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes a determination module configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
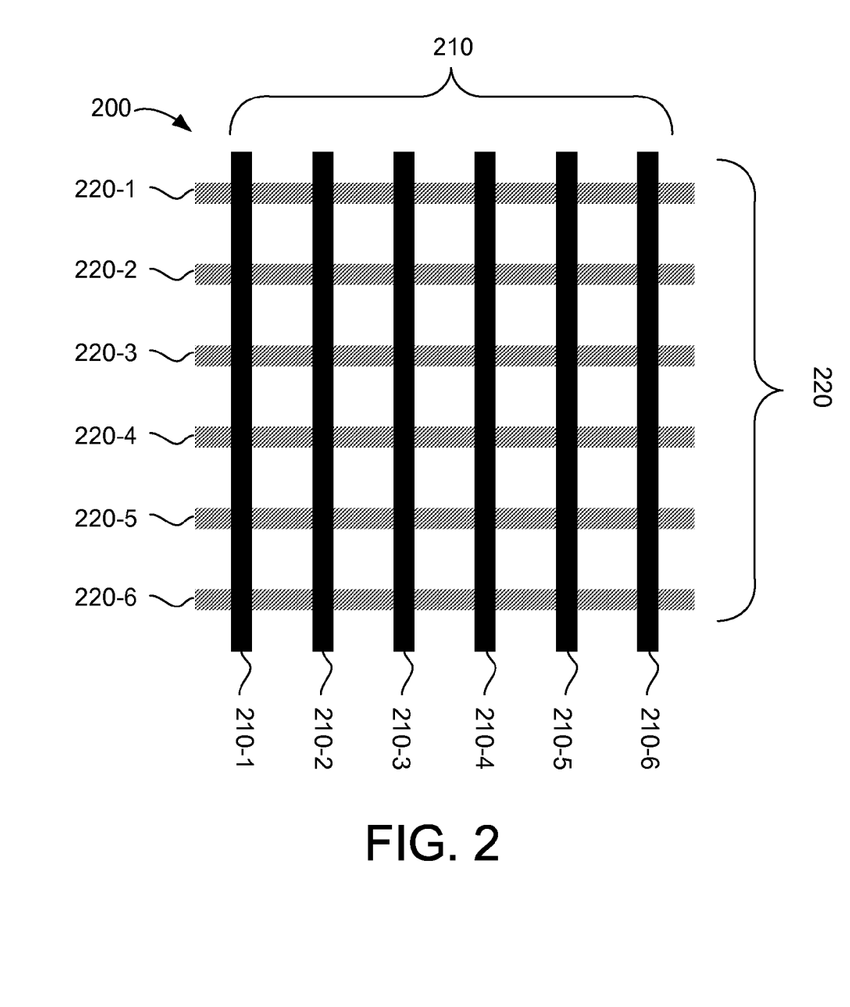
FIG. 2 is a block diagram of sensor electrodes in accordance with an exemplary embodiment of the invention.

As was described above, the processing system 110 is coupled to sensor electrodes to determine user input. Specifically, the processing system operates by detecting the capacitive coupling between one or more transmitter sensor electrodes and one or more receiver sensor electrodes. Turning now to FIG. 2, this figure conceptually illustrates an exemplary set of capacitive sensor electrodes 200 configured to sense in a sensing region. For clarity of illustration and description, FIG. 2 shows a pattern of simple rectangles; however, it will be appreciated that the invention is not so limited, and that a variety of electrode patterns may be suitable in any particular embodiment. In one embodiment, sensor electrodes 210 are configured as receiver electrodes and sensor electrodes 220 are configured as transmitter electrodes. In other embodiments, sensor electrodes 210 are configured to sense input object position and/or motion in the X direction and sensor electrodes 220 are configured to sense input object position and/or motion in the Y direction.

Sensor electrodes 210 and 220 are typically ohmically isolated from each other. That is, one or more insulators separate sensor electrodes 210 and 220 and prevent them from electrically shorting to each other. In some embodiments, sensor electrodes 210 and 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and 220 are separated by one or more layers of insulative material. In some other embodiments, sensor electrodes 210 and 220 are separated by one or more substrates; for example, they may be disposed on opposite sides of the same substrate, or on different substrates that are laminated together. The capacitive coupling between the transmitter electrodes and receiver electrodes change with the proximity and motion of input objects in the sensing region associated with the transmitter electrodes and receiver electrodes.

In a one embodiment, the sensor pattern is "scanned" to determine the capacitive couplings between transmitter and receiver electrodes. That is, the transmitter electrodes are driven to transmit transmitter signals and the receiver electrodes are used acquire the resulting signals. The resulting signals are then used to determine measurements of the capacitive couplings between electrodes, where each capacitive coupling between a transmitter electrode and a receiver electrode provides one "capacitive pixel". A set of measured values from the capacitive pixels form a "capacitive image" (also commonly referred to as a "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In accordance with the embodiments of the invention, multiple transmitter signals may be transmitted using multiple different transmitter electrodes at the same time. For example, transmitter signals corresponding to upper and lower sidebands may be transmitted simultaneously. Likewise, transmitter signals in quadrature with each other may be transmitted simultaneously. In both cases the effects of each of the simultaneously transmitted transmitter signals are received at each receiver electrode. Specifically, resulting signals are received with the receiver electrodes, where each resulting signal comprises effects corresponding to the multiple transmitted transmitter signals that were transmitted simultaneously. These received signals may then be demodulated to produce multiple output signals from which multiple capacitive measurements may be determined. Again, each of these capacitive measurements corresponds to a pixel in the capacitive image, and thus multiple pixels may be determined simultaneously. This can reduce the time needed to form the entire capacitive image and/or increase the signal to noise ratio of the sensing device, and thus may be used to improve the performance of the device.

With reference to the embodiment illustrated in FIG. 2, transmitter signals corresponding to upper and lower sidebands may be transmitted simultaneously with transmitter electrodes 220-1 and 220-2 respectively. Resulting signals may then be received with each of the receiver electrodes 210-1 to 210-6, where each resulting signal comprises effects corresponding to both the upper and lower sideband signals. These six resulting signals may then be demodulated to each produce multiple output signals from which multiple capacitive measurements may be determined. Each of these determined capacitive measurements corresponds to a pixel in the capacitive image. Thus, by so demodulating each of the resulting signals on the receiver electrodes, capacitive measurements may be determined for each of the pixels corresponding to the capacitive couplings between transmitter electrodes 220-1 and 220-2 and each of the receiver electrodes 210-1 to 210-6.

In various embodiments, transmitter signals may be simultaneously transmitted such that each transmission of a transmitter signal overlaps with at least a portion of each other transmission of the other simultaneous transmitter signal(s). In other embodiments, transmitter signals may be simultaneously transmitted such that each transmission of a transmitter signal overlaps completely or nearly completely with each other simultaneous transmission of the other simultaneous transmitter signal(s).

In this specific example, 12 such pixels may be determined for each simultaneous transmission of an upper and lower sideband signal or "transmission interval". Specifically, the pixels defined as the capacitive coupling between electrodes 220-1 and 210-1, 220-1 and 210-2, 220-1 and 210-3, 220-1 and 210-4, 220-1 and 210-5, 220-1 and 210-6, 220-2 and 210-1, 220-2 and 210-2, 220-2 and 210-3, 220-2 and 210-4, 220-2 and 210-5, and 220-2 and 210-6. This process may then be repeated for transmitter electrodes 210-3 and 210-4, and then repeated again for transmitter electrodes 210-5 and 210-6. Each of these two additional transmission intervals determines 12 more capacitive pixels. Thus, the simultaneous transmission of transmitter signals corresponding to upper and lower sidebands facilitates the determination of a complete capacitive image (36 pixels) within three transmission intervals.

A similar result may be achieved using transmitter signals that are in quadrature with each other. In this embodiment transmitter signals in quadrature phase to each other (that is a quarter period shift between the two transmitter signals) may be transmitted simultaneously with transmitter electrodes 220-1 and 220-2 respectively. Again, resulting signals may then be received with each of the receiver electrodes 210-1 to 210-6, where each resulting signal comprises effects corresponding to both of the two quadrature transmitter signals. These six resulting signals may then be demodulated to separately determine the capacitive coupling between that receiver electrode and transmitter electrodes 220-1 and 220-2. Again, in this specific example, 12 such pixels may be determined each cycle. This process may then be repeated for transmitter electrodes 210-3 and 210-4, and then repeated again for transmitter electrodes 210-5 and 210-6. Thus, the simultaneous transmission of transmitter signals corresponding to in-quadrature signals facilitates the determination of a complete capacitive image within three transmission intervals.

In further embodiments, transmitter signals that are both in quadrature with each other and correspond to upper and lower sidebands may be used. In this embodiment four transmitter signals corresponding to upper and lower sides and quadrature phases may be transmitted simultaneously with transmitter electrodes 220-1, 220-2, 220-3 and 220-4 respectively. For example, a first transmitter signal may be transmitted using electrode 220-1, a second transmitter signal may be transmitted using electrode 220-2, a third transmitter signal may be transmitted using electrode 220-3, and a fourth transmitter signal may be transmitted using electrode 220-4, where the first transmitter signal and the third transmitter signal correspond to an upper sideband, and the second transmitter signal and the fourth transmitter signal corresponds to a lower sideband, and where the first transmitter signal is in quadrature with the third transmitter signal and the second transmitter signal is in quadrature with the fourth transmitter signal. Note that in this arrangement each of the four transmitter signals is either in the opposite sideband or is in quadrature with the other three transmitter signals.

Again, resulting signals may then be received with each of the receiver electrodes 210-1 to 210-6, where each resulting signal comprises effects corresponding to the four transmitter signals. These six resulting signals may then be demodulated to separately determine the capacitive coupling between that receiver electrode and transmitter electrodes 220-1, 220-2, 220-3 and 220-4. Thus, in this specific example, 24 pixels may be determined each cycle. This process may then be repeated for remaining transmitter electrodes. In various embodiments, the rate at which a capacitive image is determined is increased by the simultaneous transmission of four transmitter signals corresponding to upper and lower sidebands and in quadrature signals. Alternatively, for a given capacitive image rate, more time can be allocated to measurements of resulting signals resulting in higher fidelity. Further, in other embodiments, the ratio of signal to noise is increased by the simultaneous transmission of the four transmitter signals.

Figure 3:
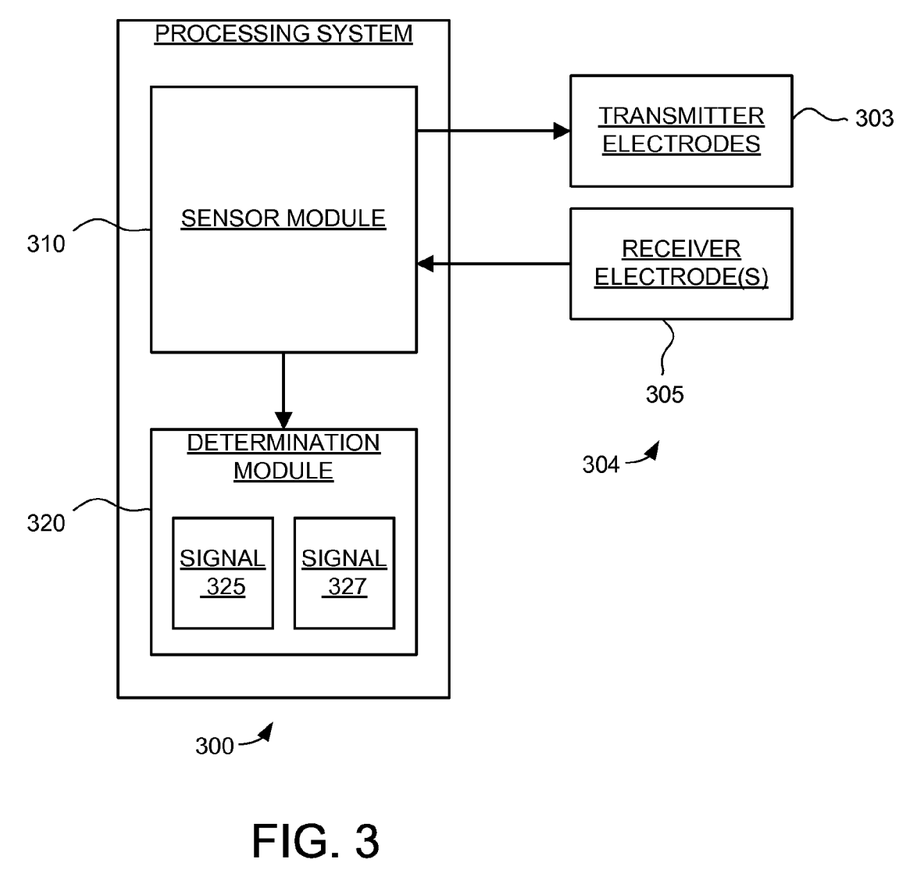
FIG. 3 is a conceptual block diagram depicting a processing system in accordance with an embodiment of the invention.

Referring now to the conceptual block diagram depicted in FIG. 3, one embodiment of an exemplary processing system 110 as shown in FIG. 1 may include a system 300. System 300, as illustrated, generally includes sensor module 310 communicatively coupled via a set of sensor electrodes (or simply "electrodes") 304, to determination module 320. In the illustrated embodiment, sensor electrodes 304 include one or more transmitter electrodes 303 and one or more receiver electrodes 305. In one specific embodiment, for example, transmitter electrodes 303 and receiver electrodes 305 are implemented as described above in connection with FIG. 2.

Sensor module 310 may include any combination of hardware and/or software configured to transmit signals with transmitter electrodes 303 and receive resulting signals with receiver electrodes 305. As was described above, the sensor module 310 is configured to transmit multiple transmitter signals simultaneously with the transmitter electrodes 303 and receive resulting signals with the receiver electrodes 305. Specifically, in accordance with the embodiments of the invention, multiple transmitter signals are transmitted simultaneously using multiple different transmitter electrodes 303. For example, transmitter signals corresponding to upper and lower sidebands may be transmitted simultaneously with two different transmitter electrodes and a resulting signal that includes the effects of both transmitted transmitter signals received with each of one or more receiver electrodes. Likewise, transmitter signals in quadrature with each other may be transmitted simultaneously and a resulting signal that includes the effects of both transmitted transmitter signals received with each of one or more receiver electrodes.

In yet another embodiment, the sensor module 310 is configured to transmit four transmitter signals corresponding to upper and lower sides and quadrature phases simultaneously on four different transmitter electrodes 303. For example, sensor module 310 is configured to transmit a first transmitter signal and a third transmitter signal corresponding to an upper sideband, and a second transmitter signal and a fourth transmitter signal corresponding to a lower sideband, where the first transmitter signal is in quadrature with the third transmitter signal and the second transmitter signal is in quadrature with the fourth transmitter signal.

To give one exemplary example, the sensor module 303 may be configured to transmit signals with a transmitter signal frequency $f_{ts}$ correspond to a carrier frequency off, and a sideband offset of $f_m$. For example, for a transmitter signal corresponding to an upper sideband, the transmitter signal frequency will correspond to the carrier frequency and the sideband offset frequency, such that $f_{ts}=f_c+f_m$ and for a transmitter signal corresponding to a lower sideband, the transmitter signal frequency will correspond to the carrier frequency and the sideband offset frequency, such that $f_{ts}=f_c-f_m$. To achieve quadrature of the signals in the same sideband, the sensor module 303 may transmit $\cos(2\pi(f_c+f_m)t)$ and $\cos(2\pi(f_c+f_m)t+\pi/2)$ such that a cosine and sine signal are transmitted with the upper-sideband. For example, the first transmitter signal may comprise $\cos((f_c+f_m), t)$, the second transmitter signal may comprises $\cos((f_c-f_m),t)$, the third transmitter signal may comprise $-\sin((f_c+f_m), t)$ and the fourth transmitter signal may comprise $-\sin((f_c-f_m), t)$. Again, this is just one example, and other embodiments are possible.

In a typical embodiment, the simultaneous transmission of transmitter signals would be done in transmission intervals, with the simultaneous transmission repeated for other groups of transmitter electrodes 303 until transmitter signals have been transmitted with all of the transmitter electrodes 303. This allows a complete set of resulting signals to be generated and received at the receiver electrodes 305 and passed to the determination module 320 as resulting signals 316.

In these embodiments the sensor module 303 may be determined to provide the transmitter signals in a variety of formats. For example, the transmitter signals may comprise any one of a sinusoidal waveform, square waveform, triangular waveform, sawtooth waveform or the like. As was noted above, the frequency of each simultaneously transmitted transmitter signal comprises a transmitter frequency ($f_{ts}$) corresponding to either an upper or lower sideband. In another embodiment, the phases of each simultaneously transmitted transmitter signal the transmitter signals are selected such that the transmitter signals are in quadrature with other of transmitter signals. And, in a combination embodiment, the frequency and phase of each simultaneously transmitted transmitter signal either corresponds to an upper or lower sideband and is in quadrature with another transmitter signal in the same sideband.

In the illustrated embodiment, determination module 320 includes any combination of hardware and/or software configured to demodulate the resulting signal to produce output signals 325 and 327. Specifically, to determine output signals 325 and 327 resulting from simultaneously transmitted transmitter signals, the determination module 320 receives a resulting signal with the receiver electrode. Because of the simultaneous transmission of the transmitter signals, each resulting signal will comprise effects of at least two different transmitter signals (e.g., at least two of an upper sideband, upper sideband quadrature signal, lower sideband signal, and a lower sideband quadrature signal). In one specific embodiment, each resulting signal will comprise effects of four different transmitter signals (e.g., two upper sideband signals in quadrature with each other, and two lower sideband signals in quadrature with each other).

The determination module is configured to demodulate the resulting signal to separate the effects of these different simultaneously transmitted transmitter signals and produce output signals 325 and 327. A variety of different demodulation techniques may be used to demodulate the resulting signal 316, including analog and digital demodulation techniques.

In one embodiment, determination module 320 is configured to demodulate resulting signal 316 to produce output signals corresponding to upper sideband signal 325 and lower sideband signal 327. In one embodiment, determination module comprises a first quadrature demodulator and a second quadrature demodulator. The first quadrature demodulator may corresponds to an upper-sideband in-phase transmitter signal and upper-sideband quadrature phase transmitter signal and the second quadrature demodulator corresponds to a lower-sideband in-phase transmitter signal and a lower-sideband quadrature phase transmitter signal. In such embodiments, the quadrature demodulator may comprise, but not limited to, a Weaver demodulator, a Hartley demodulator, image reject filtering and the like. Examples of various demodulators that may be used in determination modules will be described in more detail with reference to FIGS. 4, 5 and 6 below.

Determination module 320 is further configured to determine measurements of changes in capacitive coupling between transmitter electrodes of transmitter electrodes 303 and a receiver electrode of receiver electrodes 305 based on at least one of output signal 325 and output signal 327. In one embodiment, determination module 320 is further configured to selectively determine measurements of changes in capacitive coupling between transmitter electrodes of transmitter electrodes 303 and a receiver electrode of receiver electrodes 305 based on at least one of output signal 325 and output signal 327. Determination module 320 is configured to then determine positional information for an input object (e.g., input object 140 in FIG. 1) based on the measurements. In other embodiments measures of interference may be determined based on at least one of output signal 325 and output signal 327. Such embodiments that facilitate the determination of measures of interference will be discussed in greater detail below.

Figure 4:
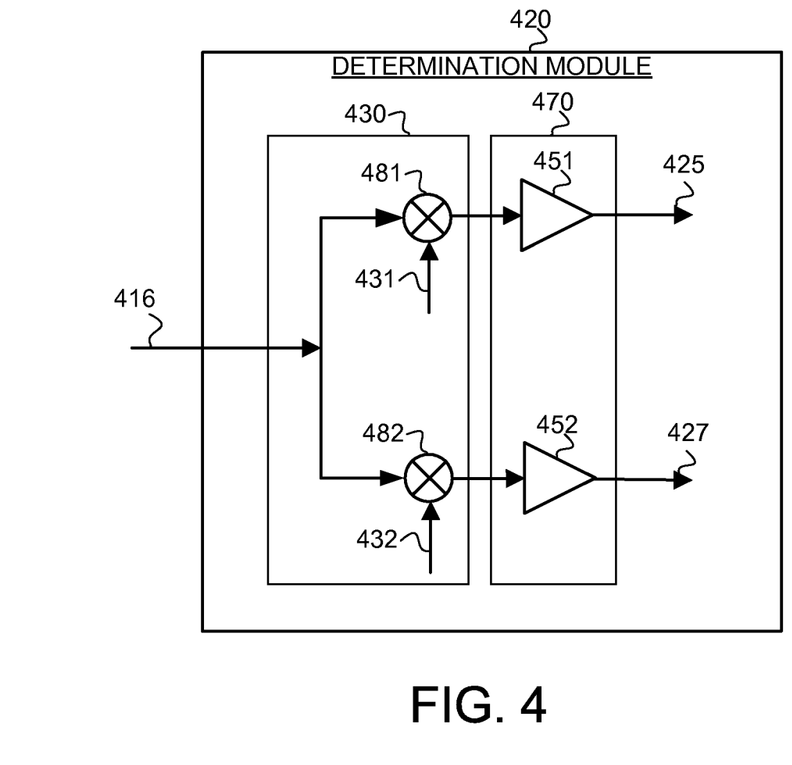
FIG. 4 is a conceptual block diagram depicting a determination module in accordance with an embodiment of the invention.
Figure 5:
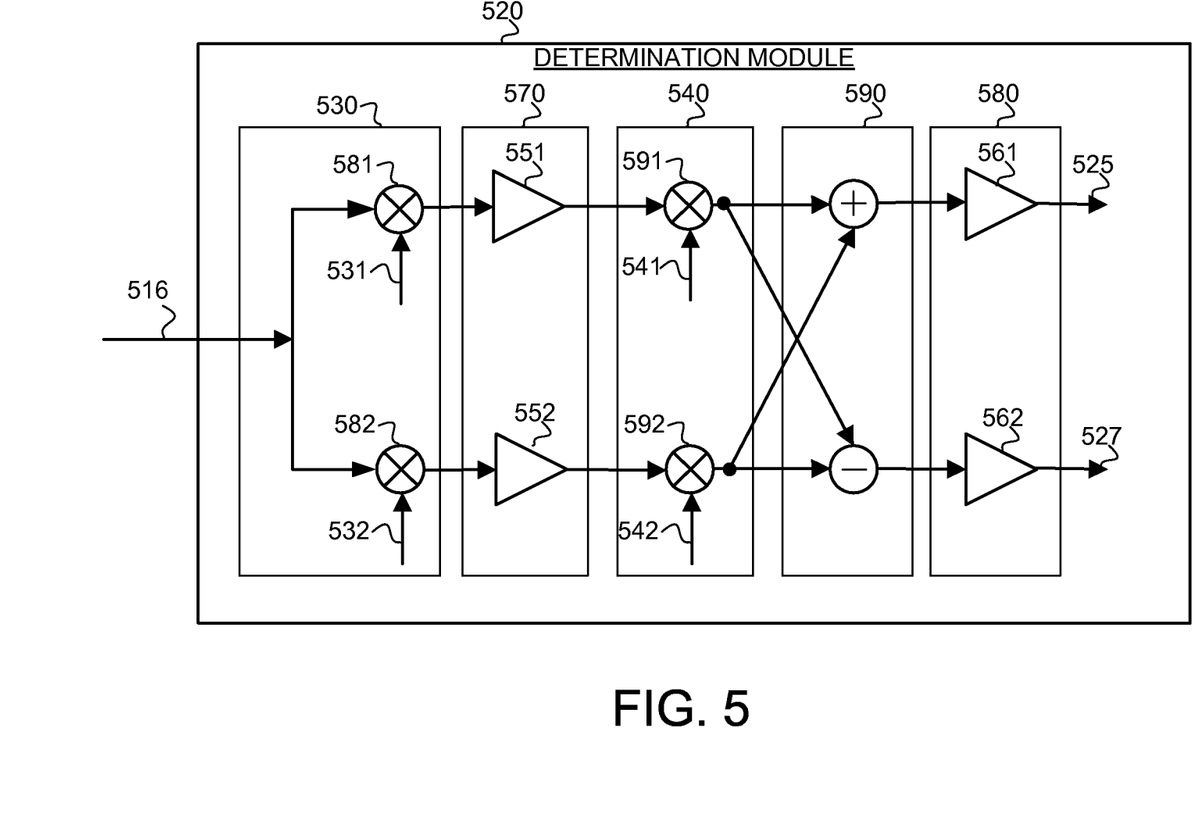
FIG. 5 is a conceptual block diagram depicting a determination module in accordance with an embodiment of the invention.
Figure 6:
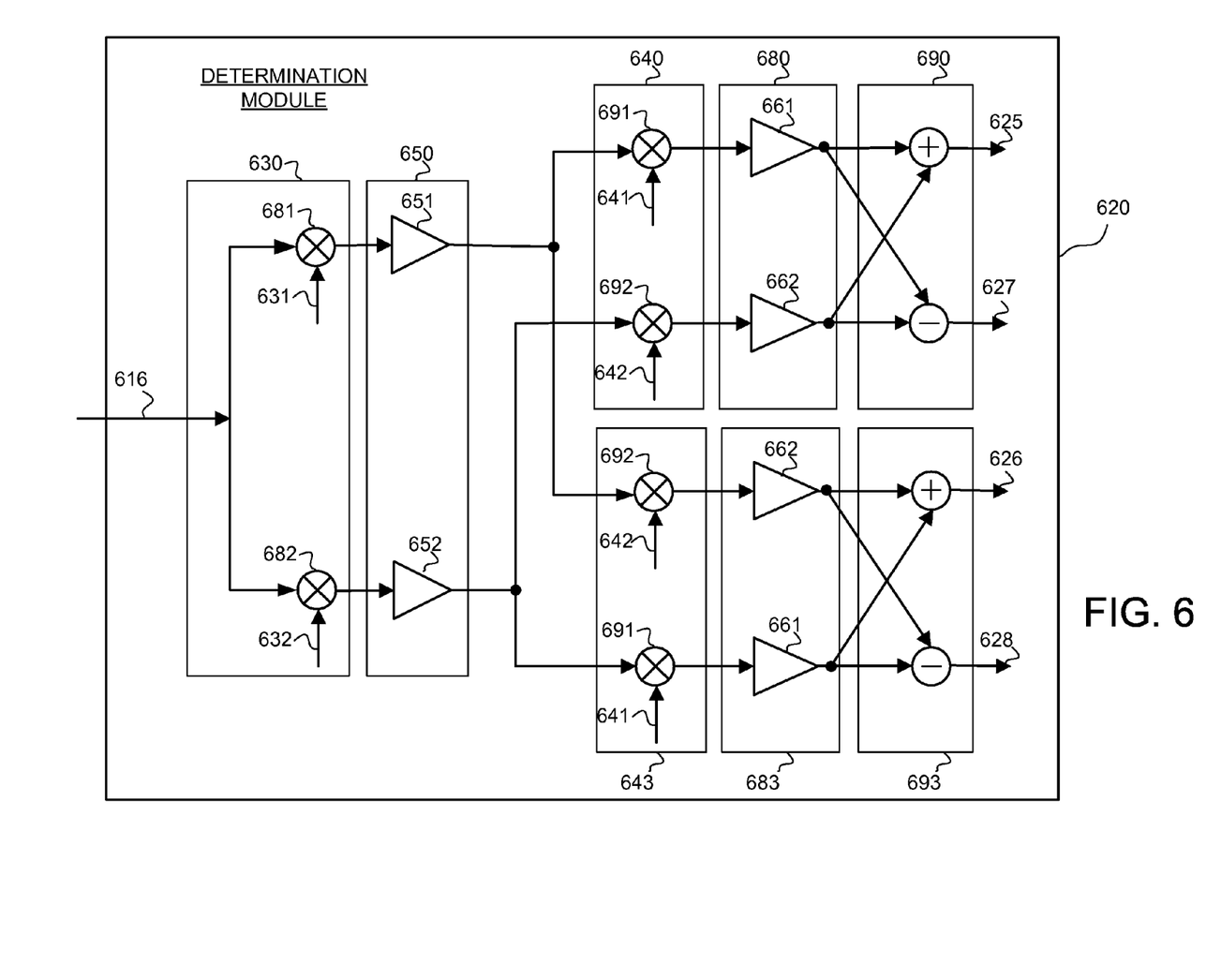
FIG. 6 is a conceptual block diagram depicting a determination module in accordance with an embodiment of the invention.

Next, FIGS. 4, 5 and 6 illustrate schematic diagrams of various exemplary determination modules. The embodiments illustrated in FIGS. 4 and 5 are particularly applicable to embodiments where at least two transmitter signals are transmitted simultaneously from at least two different transmitter electrodes and the resulting signal is received with a receiver electrode. Again, in such an embodiment, the at least two transmitter signals may correspond to upper and lower sidebands and/or may be in quadrature with each other. In each case, the determination module receives a resulting signal and generates two output signals, with each of the at least two corresponding to the effects of one of the least two transmitter signals. Thus, capacitive measurements for two capacitive pixels may be determined simultaneously. However, it should also be noted the embodiments illustrated in FIGS. 4 and 5 are only examples and not meant to be limiting in any way. While specific elements may be illustrated and described, the determination module may be comprised of any elements and features that are able to demodulate the resulting signal to produce the corresponding output signals.

Turning now to FIG. 4, a schematic diagram of exemplary determination module circuitry 420 is illustrated. The determination module receives a resulting signal 416 from the sensor module 410 and generates two output signals 425 and 427. In this embodiment, determination module comprises mixing stage 430 and filter stage 470. In the illustrated embodiment, mixing stage 430 comprises mixers 481 and 482 and uses a first mixing signal 431 and a second mixing signal 432. In various embodiments, determination module 420 is configured to demodulate resulting signal 416 into output signal 425 and 427, where output signal 427 and output signal 425 correspond to a first and second transmitter signal that are in quadrature with one another.

In various embodiments, a measurement of a change in capacitive coupling between a first transmitter electrode and a receiver electrode and a second transmitter electrode and the receiver electrode may be determined based on output signals 425 and 427. For example, a first transmitter signal and a second transmitter signal may be simultaneously transmitted with a first transmitter electrode and a second transmitter electrode, respectively, where the first and second transmitter signals are in quadrature with one another. Resulting signal 416 may be received with the receiver electrode and demodulated by the determination module, to produce output signals 425 and 427. Output signals 425 and 427 may be used to determine the measurements of capacitive coupling between transmitter and receiver electrodes. In other embodiments, as will be described in more detail below, the interference of a transmitter signal may be determined based on output signal 427.

It should be noted that the embodiment illustrated in FIG. 4 is just one example of the type of demodulation technique that may be used to demodulate resulting signals that correspond to first and second transmitter signals that are in quadrature with each other, and in other embodiments any other demodulation technique that can produce output signal 425 and 426 from the resulting signal(s) may be used.

Turning now to FIG. 5, a schematic diagram of another exemplary determination module 520 is illustrated. The determination module 520 receives a resulting signal 516 from a sensor module and generates two output signals 525 and 527. In this embodiment, determination module 520 includes two mixing stages 530 and 540, two filter stages 570 and 580, and summation stage 590. It should be noted that FIG. 5 provides a simplified schematic, and that practical embodiments may include additional circuit components. For example, additional filters and mixers may be incorporated into determination module 520.

In the illustrated embodiment, mixing stage 530 comprises mixers 581 and 582 and uses a first mixing signal 531 at the sideband frequency and a second mixing signal 532 in quadrature with signal 531. Similarly, mixing stage 540 comprises mixers 591 and 592 and uses a third mixing signal 541 at a third frequency and a fourth mixing signal 592 at a fourth mixing frequency. In accordance with one embodiment, the first mixing frequency and the second mixing frequency correspond to the carrier frequency of the transmitter signal, and the third mixing frequency and fourth mixing frequency correspond to the modulation of the transmitted transmitter signal. In various embodiments mixing signal 532 is in quadrature with mixing signal 531 and mixing signal 542 is in quadrature with mixing signal 541. As one example, as is described above, the transmitter signal frequency, $f_{ts}$, is a combination of the carrier frequency ($f_c$) and the modulation frequency ($f_m$). As such, mixing frequency of mixing signals 531 and 532 may correspond to carrier frequency ($f_c$), while mixing frequency of mixing signals 541 and 541 may correspond to the modulation frequency ($f_m$).

As shown, each output of mixing stage 540 is ultimately summed to produce at least one signal that can be used in determining a measure of the capacitive coupling between transmitter and receiver electrodes. In one embodiment, at least one of the signals produced by the summation is an uncorrelated signal (i.e., a signal with no DC component).

In various embodiments, measurements of a change of capacitive coupling may be determined using both signals 525 and 527. In one embodiment, for example, the first measurement is determined based on signal 525 for the effects corresponding to first a transmitter signal corresponding to an upper sideband and a second measurement of a change in capacitive coupling may determined based on signal 527 for the effects corresponding to a second transmitter signal corresponding to a lower sideband.

While filter stage 580 is illustrated as following summation stage 590, in various embodiments, filter stage 580 may occur between second mixing stage 540 and summation stage 590. In one embodiment, when filter stage follows summation stage 590, filter 561 and 562 may be configured to perform signal processing, such as integration, analog to digital conversion or the like. In various embodiments, filter stage 570 and 580 may comprise a variety of filter types including low pass filters, band pass filters or the like.

In various embodiments, the determination module 520 does not include summation stage 590. In such embodiments, one or more of the filters in filter stage 570 are implemented with image reject filters. The image reject filter may comprise a complex filter, an asymmetric polyphase filter, a real filter or the like. Furthermore, filter stage 570 may be configured to substantially attenuate predetermined frequencies, while not substantially attenuating other frequencies.

It should be noted that the embodiment illustrated in FIG. 5 uses demodulation technique sometimes referred to as "Weaver demodulation". However, this is just one example of the type of demodulation technique that may be used to demodulate resulting signals that correspond to a first transmitter signal in an upper sideband and a second transmitter signal in a lower sideband, and in other embodiments any other demodulation technique that can produce output signal 425 and 426 from the resulting signal(s) may be used.

Turning now to FIG. 6, a schematic diagram of another exemplary determination module 620 is illustrated. In contrast with the previous embodiments, the embodiment illustrated in FIG. 6 is particularly applicable to applications where four transmitter signals are transmitted simultaneously from four different transmitter electrodes and the resulting signal is received with a receiver electrode. In such an embodiment, upper and lower sidebands both have in-phase and quadrature phase transmitter signals that are transmitted simultaneously with four different transmitter electrodes and received with a receiver electrode.

The determination module 620 receives a resulting signal 616 from a sensor module and generates four output signals 625, 627, 626 and 628. Each of these four output signals corresponds to the effects of one of the four transmitter signals. Thus, capacitive measurements for four capacitive pixels may be determined simultaneously. In this embodiment, output signals 625 and 626 correspond to upper sideband transmitter signals that are in quadrature with each other, and output signals 627 and 628 correspond to lower sideband transmitter signals that are in quadrature with each other.

The first mixing stage 630 includes mixers 681 and 682 that receive the resulting signal 616. The first mixing stage removes the carrier signals from the resulting signal 616. Mixers 681 and 682 modulate resulting signal 616 with the transmitter signal carrier frequency ($f_c$) and a quadrature phase shifted version ($f_c'$). The filter stage 650 then uses two low pass filters (or bandpass filters) 651 and 652 to remove the high frequency image from the mixer outputs. Mixing stages 640 and 643 use the sideband modulation frequency ($f_m$) and a quadrature phase shifted version ($f_m'$) with mixers 691 and 692 to produce baseband signals. The image signals from mixing stages 640 and 643 are removed by the filtering stages 680 and 683.

The baseband signals are processed by the summation stages 690 and 693 to extract output signals 625, 626, 627 and 628, where output signals 625 and 626 correspond to upper sideband transmitter signals that are in quadrature with each other, and the output signals 627 and 628 correspond to lower sideband transmitter signals that are in quadrature with each other. The determination module 620 is capable of receiving four transmitter signals that were substantially simultaneously transmitted from four different transmitter electrodes, and the four output signals can each be used to determine a measure of the capacitive coupling between the corresponding transmitter electrode and the receiver electrode that resulting signal 616 was received with.

In addition to the implementations illustrated above, the determination module may be implemented with a variety of signal processing techniques, including digital signal processing.

As was described above, the determination module of the various embodiments is configured to receive a resulting signal to determine output signals. From the output signals the determination module may determine measures of change in capacitive coupling between transmitter electrodes and a receiver electrode(s). These measurements may be used to determine a wide variety of positional information regarding objects in the sensing region. However, in some embodiments some output signals may not be used for position determination, and may instead be used to detect and/or determine measures of interference.

Input devices such as those described above may be impacted by a variety of different types of interference. For example, the interference may comprise random fluctuations in electrical signals, typically referred to as noise. The interference may also comprise other electrically and thermally created distortions in signals. The input device interference may come from a variety of sources. For example, the interference may comprise background interference that affects the input device even when no input object is present. Examples of background interference sources include other nearby electrical elements, such as display screens, conductors, other electrodes, etc. As another example, the interference may comprise input object coupled interference. This type of interference is coupled to the input device when an input object such as a finger is in or near the sensing region. For example, electrical noise from other sources such as fluorescent lights may be coupled to the input device when a finger is present in the sensing region. All of these types of interference may negatively impact the performance of the input device, and may be measured during the second portion of the resulting signal.

As described above, in various embodiments one or more output signals may be generated by the determination module and used to determine measures of interference in the sensor device. In general, the output signals that are used to determine measures of interference would not correspond to a specific transmitted transmitter signal. Instead, output signals for other sidebands or quadrature phases would be used determine interference, while the output signals that correspond to transmitted transmitter signals are used to determine positional information. As one example, if a transmitted transmitter signal corresponded to a first phase, an output signal in quadrature with the output signal corresponding to the transmitted transmitter signal may be used to determine interference for that transmitted transmitter signal. For example, in one embodiment as related to FIG. 6, output signal 625 corresponds to a transmitted transmitter signal, and output signal 626 does not correspond to a transmitted transmitter signal. In such an example, a determination of the interference of the transmitted transmitter signal may be based on output signal 626.

In another specific example, at least two transmitter signals may be simultaneously transmitted with at least two different transmitter electrodes, with the first transmitter signal corresponding to an upper sideband, and the second transmitter signal corresponding to a lower sideband. Note that in this embodiment, no third and fourth transmitter signals in quadrature with the first and second transmitter signals are simultaneously transmitted. Instead, an output signals corresponding to the "empty transmission slots" (e.g., the quadrature phases) may be used to determine a measure of interference for at least one of the first and second transmitter signals. Note again that this is just one example, and that an output signal corresponding to either sideband.

In other embodiments, while a first output signal, corresponding to one of an upper or lower sideband signal is used to determine positional information, a further output signal, corresponding to the other sideband is used to determine the interference that is present in the unused sideband. For example, at least two transmitter signals may be substantially simultaneously transmitted with at least two different transmitter electrodes; the first and second transmitter signal in quadrature with each other corresponding to either an upper or lower sideband. Note that in this embodiment, a transmitter signal corresponding to the other sideband (either in quadrature or not) is not transmitted. Instead, an output signal corresponding to the other sideband may be used to determine the interference present in that sideband. For example, if the transmitted transmitter signals correspond to a lower sideband signal, the interference in an upper sideband may be determined and if the transmitted transmitter signals correspond to an upper sideband signal, the interference in a lower sideband signal may be determined.

In any of the above embodiments, the output signal would be determined using the various techniques described above, including the demodulation, mixing and filtering shown in FIGS. 4, 5 and 6. However, it should be noted that while a demodulator may be used, such a device would not be performing demodulation in the technical sense. Specifically, because the interference was not originally modulated, it is not actually demodulated by the demodulator. Instead, the demodulator really functions as a type of sampler and/or combiner of the resulting signal to determine the corresponding output signals in these embodiments.

A variety of different techniques may be used to determine interference using the output signal. For example, in various embodiments, the measure of interference may be based on a peak to peak amplitude measurement, frequency or bandwidth measurement, power spectral density measurement, volts squared per hertz or the like. In doing so, the output signals can be individually and/or collectively processed in any manner to determine the amount of interference. For example, the output signals may be combined with other signals by adding, subtracting, squaring, sum of the squares, squaring of differences, etc.

As other examples, the output signals can be analyzed over any suitable period of time to determine an interference measurement. For example, the maximum absolute value of the interference outputs over some time period may be recorded. Alternatively, the average absolute values may be computed. Alternatively, the mean square or root mean square derivative may be computed. Alternatively, the mean square or root mean square derivative may be computed. Further, in other embodiments, other statistical properties may be computed and analyzed to determine an interference measurement.

As one specific example, because multiple simultaneous measurements are available, the system may determine the positional information based on whichever transmitter signal is substantially "clean" of interference when compared to other such transmitter signals. In one embodiment, the interference measure of two output signals can be compared to each other to determine the substantially "clean" transmitter signal. In further embodiments, the output signals can be compared to a baseline value or values to determine the substantially "clean" transmitter signal which is used for position determination.

A variety of different actions may be taken in response to measure of interference. For example, the system may be configured to change to a transmitter signal having a different transmitter frequency in response to a measure of interference that meets some predetermined criteria. For example, in one embodiment, the sensor module is configured to transmit a second transmitter signal, different from the first transmitter signal, based on a compared measure of interference. For example, in one embodiment, the sensor module may transmit a different transmitter signal when it determines that the amplitude of the measure of interference is satisfies a predetermined threshold. In various embodiments, satisfying a threshold may include meeting, exceeding, being below the threshold or any combination thereof. In yet other embodiments, sensor module may shift from transmitting the first or second transmitter signal to transmitting a third transmitter signal based on a measure of interference of at least one transmitter signal. In another embodiment, the processing system may shift from transmitting first and second transmitter signals corresponding to either an upper or lower sideband to transmitting a third and fourth transmitter signal corresponding to the other sideband based on the determined interference.

When determined, the measures of interference may be used for a variety of purposes. For example, the sensor module may be configured to transmit a second transmitter signal, different from the first transmitter signal, based on this measure of interference. In this regard, a sensor module may have any number of candidate transmitter signals having a variety of frequencies and phases. As one specific example, the sensor module may be configured to select one of several different mixing frequencies, such that the sideband of the transmitter signal may be "hopped" to the other sideband. For example, by selecting different mixing frequencies, an upper sideband transmitter signal may placed in a lower sideband, such that the interference of a new upper sideband transmitter signal may be determined. Further, in another example by selecting different mixing frequencies, a lower sideband transmitter signal may placed in an upper sideband, such that the interference of a new lower sideband transmitter signal may be determined.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an input device comprising:
   a sensor module comprising sensor circuitry, the sensor module configured to:
      simultaneously transmit a first transmitter signal with a first transmitter electrode and a second transmitter signal with a second transmitter electrode, wherein the first transmitter signal corresponds to an upper sideband and the second transmitter signal corresponds to a lower sideband; and
      receive a resulting signal with a receiver electrode, wherein the resulting signal comprises effects corresponding to both the first transmitter signal and the second transmitter signal; and
   a determination module configured to:
      demodulate the resulting signal to produce a first output signal and a second output signal;
      determine positional information for an input object based on at least one of the first output signal and the second output signal.

2. The processing system of claim 1 wherein the determination module is configured to determine the positional information for the input object based on at least one of the first output signal and the second output signal by:
   determining a first measurement of change in capacitive coupling between the first transmitter electrode and the receiver electrode based at least in part on first output signal;
   determining a second measurement of change capacitive coupling between the second transmitter electrode and the receiver electrode based at least in part on the second output signal; and
   determining the positional information for the input object based on at least one of the first measurement and the second measurement.

3. The processing system of claim 1 wherein the determination module is further configured to:
   demodulate the resulting signal to produce a third output signal and a fourth output signal, the third output signal is in quadrature with the first output signal and the fourth output signal is in quadrature with the second output signal.

4. The processing system of claim 3 wherein the determination module is further configured to:
   determine first interference information for the first transmitter signal based on the third output signal and determine second interference information for the second transmitter signal based on the fourth output signal.

5. The processing system of claim 4 wherein the determination module is further configured to:
   shift from simultaneously transmitting the first transmitter signal with the first transmitter electrode and the second transmitter signal with the second transmitter electrode to simultaneously transmitting a third transmitter signal with the first transmitter electrode and a fourth transmitter signal with the second transmitter signal based on at least one of the first interference information and the second interference information.

6. The processing system of claim 1 wherein:
the sensor module is further configured to:
simultaneously transmit with the first transmitter signal, a third transmitter signal with a third transmitter electrode and a fourth transmitter signal with a fourth transmitter electrode, wherein the third transmitter signal is in quadrature with the first transmitter signal and corresponds to the upper sideband and the fourth transmitter signal is in quadrature with the second transmitter signal and corresponds to the lower sideband; and
wherein the resulting signal further comprises effects corresponding to the third transmitter signal and the fourth transmitter signal; and
wherein the determination module is further configured to:
demodulate the resulting signal to produce a third output signal and a fourth output signal; and
determine the positional information for the input object further based on at least one of the third output signal and the fourth output signal.

7. The processing system of claim 6 wherein the determination module comprises a first quadrature demodulator corresponding to the first transmitter signal and the third transmitter signal and a second quadrature demodulator corresponding to the second transmitter signal and the fourth transmitter signal.

8. The processing system of claim 1 wherein the processing system is configured to determine a capacitive image based at least in part on the first output signal and the second output signal.

9. A processing system for an input device comprising:
a sensor module comprising sensor circuitry, the sensor module configured to:
simultaneously transmit a first transmitter signal with a first transmitter electrode and a second transmitter signal with a second transmitter electrode, wherein the first transmitter signal is in quadrature with the second transmitter signal; and
receive a resulting signal with a receiver electrode, wherein the resulting signal comprises effects corresponding to both the first transmitter signal and the second transmitter signal; and
a determination module configured to:
demodulate the resulting signal to produce a first output signal and a second output signal;
determine positional information for an input object based on at least one of the first output signal and the second output signal.

10. The processing system of claim 9 wherein the determination module is configured to determine the positional information for the input object based on at least one of the first output signal and the second output signal by:
determining a first measurement of change in capacitive coupling between the first transmitter electrode and the receiver electrode based at least in part on first output signal;
determining a second measurement of change in capacitive coupling between the second transmitter electrode and the receiver electrode based at least in part on the second output signal; and
determining the positional information for the input object based on at least one of the first measurement and the second measurement.

11. The processing system of claim 9 wherein demodulating the resulting signal to produce the first output signal and a second output signal comprises demodulating the resulting signal to produce the first output signal, the second output signal and a third output signal.

12. The processing system of claim 11 wherein the determination module is further configured to:
determine interference information of a third transmitter signal based on the third output signal.

13. The processing system of claim 12 wherein the sensor module is further configured to:
shift from simultaneously transmitting the first transmitter signal with a first transmitter electrode and a second transmitter signal with a second transmitter electrode to simultaneously transmitting the third transmitter signal with the first transmitter electrode and one of the second transmitter signal or a fourth transmitter signal with the second transmitter electrode.

14. The processing system of claim 9 wherein the first transmitter signal corresponds to an upper sideband, and wherein;
the sensor module is further configured to:
simultaneously transmit with the first transmitter signal, a third transmitter signal with a third transmitter electrode and a fourth transmitter signal with a fourth transmitter electrode, wherein the third transmitter signal corresponds to a lower sideband and the fourth transmitter signal is in quadrature with the third transmitter signal; and
wherein the resulting signal further comprises effects corresponding to the third transmitter signal and the fourth transmitter signal; and
wherein the determination module is further configured to:
demodulate the resulting signal to produce a third output signal and a fourth output signal; and
determine the positional information for the input object further based on at least one of the third output signal and the fourth output signal.

15. The processing system of claim 14 wherein the determination module comprises a first quadrature demodulator for processing the first transmitter signal and the second transmitter signal and a second quadrature demodulator for processing the third transmitter signal and the fourth transmitter signal.

16. The processing system of claim 9 wherein the processing system is configured to determine a capacitive image based at least in part on the first output signal and the second output signal.

17. An input device comprising:
a first transmitter electrode and a second transmitter electrode;
a receiver electrode;
a processing system operatively coupled to the first transmitter electrode, the second transmitter electrode, and the receiver electrode, the processing system configured to:
simultaneously transmit a first transmitter signal with the first transmitter electrode, a second transmitter signal with the second transmitter electrode, wherein the first transmitter signal corresponds to an upper sideband, and wherein the second transmitter signal corresponds to a lower sideband;
receive a resulting signal with the receiver electrode, wherein the resulting signal comprises effects corresponding to each of the first transmitter signal and the second transmitter signal;

demodulate the resulting signal to produce a first output signal and a second output signal;

determine a first measurement of change of capacitive coupling between the first transmitter electrode and the receiver electrode based at least in part on first output signal;

determine a second measurement of change of capacitive coupling between the second transmitter electrode and the receiver electrode based at least in part on the second output signal; and determine positional information for an input object based on at least in part the first measurement and the second measurement.

18. The input device of claim 17 wherein the processing system is configured to determine positional information for the input object based on at least in part the first measurement and the second measurement by determining a capacitive image based on at least in part the first measurement and the second measurement.

19. The input device of claim 17 wherein the processing system is further configured to:

demodulate the resulting signal to produce a third output signal and a fourth output signal, the third output signal is in quadrature with the first output signal and the fourth output signal is in quadrature with the second output signal; and determine first interference information for the first transmitter signal based on the third output signal and determine second interference information for the second transmitter signal based on the fourth output signal.

20. The input device of claim 19 wherein the processing system is further configured to:

shift from simultaneously transmitting the first transmitter signal with the first transmitter electrode and the second transmitter signal with the second transmitter electrode to simultaneously transmitting a third transmitter signal with the first transmitter electrode and a fourth transmitter signal with the second transmitter signal based on at least one of the first interference information and the second interference information.

21. The input device of claim 17 wherein the processing system is further configured to:

simultaneously transmit with the first transmitter signal, a third transmitter signal with a third transmitter electrode and a fourth transmitter signal with a fourth transmitter electrode, wherein the third transmitter signal is in quadrature with the first transmitter signal and corresponds to the upper sideband and the fourth transmitter signal is in quadrature with the second transmitter signal and corresponds to the lower sideband; and wherein the resulting signal further comprises effects corresponding to the third transmitter signal and the fourth transmitter signal; and demodulate the resulting signal to produce a third output signal and a fourth output signal; and determine the positional information for the input object further based on at least one of the third output signal and the fourth output signal.

22. An input device comprising:

a first transmitter electrode, a second transmitter electrode, a third transmitter electrode, and a fourth transmitter electrode;

a receiver electrode;

a processing system operatively coupled to the first transmitter electrode, the second transmitter electrode, the third transmitter electrode, the fourth transmitter electrode, and the receiver electrode, the processing system configured to:

simultaneously transmit a first transmitter signal with the first transmitter electrode, a second transmitter signal with the second transmitter electrode, a third transmitter signal with the third transmitter electrode, and a fourth transmitter signal with the fourth transmitter electrode, wherein the first transmitter signal and the third transmitter signal correspond to an upper sideband, and the second transmitter signal and the fourth transmitter signal corresponds to a lower sideband, and wherein the first transmitter signal is in quadrature with the third transmitter signal and the second transmitter signal is in quadrature with the fourth transmitter signal;

receive a resulting signal with the receiver electrode, wherein the resulting signal comprises effects corresponding to each of the first transmitter signal, the second transmitter signal, the third transmitter signal and the fourth transmitter signal;

demodulate the resulting signal to produce a first output signal, a second output signal, a third output signal, and a fourth output signal; and determine a first measurement of change of capacitive coupling between the first transmitter electrode and the receiver electrode based at least in part on first output signal;

determine a second measurement of change of capacitive coupling between the second transmitter electrode and the receiver electrode based at least in part on the second output signal;

determine a third measurement of change of capacitive coupling between the third transmitter electrode and the receiver electrode based at least in part on third output signal;

determine a fourth measurement of change of capacitive coupling between the fourth transmitter electrode and the receiver electrode based at least in part on the fourth output signal;

determine positional information for an input object based on at least in part the first measurement, the second measurement, the third measurement and the fourth measurement.

23. The input device of claim 22 wherein the processing system is configured to determine positional information for the input object based on at least in part the first measurement, the second measurement, the third measurement and the fourth measurement by determining a capacitive image based on at least in part the first measurement, the second measurement, the third measurement and the fourth measurement.

* * * * *